(12) United States Patent
Farquharson et al.

(10) Patent No.: US 6,637,509 B2
(45) Date of Patent: Oct. 28, 2003

(54) WELLHEAD STUFFING BOX SUPPORT ASSEMBLY

(75) Inventors: Keith D. Farquharson, Edmonton (CA); Daniel J. Riddell, Edmonton (CA)

(73) Assignee: Stream-Flo Industries Ltd., Edmonton (CA)

(*) Notice: Subject to any disclaimer, the term of this patent is extended or adjusted under 35 U.S.C. 154(b) by 30 days.

(21) Appl. No.: 10/038,935

(22) Filed: Jan. 4, 2002

(65) Prior Publication Data

US 2003/0127220 A1 Jul. 10, 2003

(51) Int. Cl.[7] .............................................. E21B 19/00
(52) U.S. Cl. ................. 166/84.1; 166/241.2; 166/75.13
(58) Field of Search ........................... 166/84.1, 241.2, 166/75.13

(56) References Cited

U.S. PATENT DOCUMENTS

| 4,099,562 A | | 7/1978 | Mattoon |
|---|---|---|---|
| 5,112,140 A | | 5/1992 | Cherny et al. |
| 5,636,688 A | * | 6/1997 | Bassinger ................. 166/84.4 |
| 5,711,533 A | | 1/1998 | Angelo et al. |
| 5,878,812 A | | 3/1999 | Heinonen et al. |
| 6,000,469 A | * | 12/1999 | Bassinger ................. 166/84.1 |
| 6,412,783 B1 | * | 7/2002 | Finnestad ................. 277/329 |

* cited by examiner

Primary Examiner—David Bagnell
Assistant Examiner—G M Collins
(74) Attorney, Agent, or Firm—Marsh Fischmann & Breyfogle LLP

(57) ABSTRACT

A stuffing box support assembly is configured to be positioned between a production pumping tree and a stuffing box of a wellhead. In use, the support assembly functions like a joint between the wellhead production tree and the stuffing box. The support assembly is configured such that it could tilt or move laterally to maintain a coaxial relationship between the stuffing box and a polished rod extending therethrough. This alignment between the stuffing box and the polished rod reduces wear and tear of the stuffing box packing.

3 Claims, 2 Drawing Sheets

WELLHEAD STUFFING BOX SUPPORT ASSEMBLY

FIELD OF THE INVENTION

The invention relates to a stuffing box support assembly to be positioned between the production pumping tree and the stuffing box of a wellhead. The assembly provides means which enable the stuffing box to be tilted and/or shifted laterally relative to the axis of the pumping tree. As a result, the axis of the stuffing box can be aligned with the axis of the polished rod extending therethrough to reduce wear of the stuffing box packing.

BACKGROUND OF THE INVENTION

The typical wellhead of a rod pumping well includes:

a tubing head, from which a string of production tubing is suspended;

a production pumping tree comprising a tubing head adapter connection, a production blowout preventer section, a flow tee section and a top connection;

a stuffing box; and a pumping jack assembly for reciprocating the polished rod of a rod string which operates a downhole pump.

The stuffing box contains packing which seals around the polished rod to prevent fluid leakage.

The pumping tree and stuffing box together form a vertical joint bore extending therethrough.

The polished rod is sometimes axially or angularly misaligned relative to the axis of the pumping tree and stuffing box. As a result the polished rod bears against one side of the packing and wear and leakage soon occur.

It is known to provide a support assembly or adjustable joint between the pumping tree and the stuffing box to enable the axis of the latter to be tilted or shifted laterally to a limited extent. This is taught in U.S. Pat. No. 5,112,140, issued to Cherny et al. However the assembly shown in the '140 patent stands quite tall.

It is the object of the present invention to provide a joint of this type which is compact and which is adapted to incorporate a flapper valve or like means to close off the joint bore in the event the polished rod parts or the rod string drops or is removed.

SUMMARY OF THE INVENTION

In accordance with a preferred and specific embodiment of the invention a support assembly is provided for connection between the upper end of a production pumping tree and the lower end of a stuffing box. The support assembly comprises:

A tubular lower housing forming a vertical bore having a reduced diameter lower bore portion, an expanded diameter intermediate bore portion and a further expanded diameter upper bore portion. The side wall of the housing forms a horizontal, annular, flat, internal shoulder at the junction of the intermediate and upper bore sections;

A lower ring, having a horizontal flat bottom surface and a spherically curved top surface, seated on the internal shoulder of the lower housing. The lower ring has a central opening of sufficient diameter to accommodate the polished rod with a lateral clearance. It also has a lateral clearance at its outer circumference with the side wall of the lower housing. The central opening of the lower ring is smaller than the diameter of the intermediate bore portion. As a result, the lower ring extends inwardly of the side wall of the lower housing. From the foregoing, it will be noted that the bottom ring can shift laterally, it enables the polished rod to extend therethrough and it permits the rod to shift or tilt within it. It also provides an overhanging support from which an underlying closure member, such as a spring activated flapper valve, may be suspended;

An upper housing having a tubular main body and a flange protruding outwardly from the bottom end of the main body. The flange has spherically curved top and bottom surfaces having a common center. The flange bottom surface is adapted to conform to the top surface of the lower ring and the flange is seated on the lower ring. The flange also has a lateral clearance with the side wall of the lower housing. The bore of the main body is sized to pass the polished rod with a lateral clearance. From the foregoing, it will be noted that the upper housing can tilt by sliding on the bottom ring and can shift laterally;

An upper ring, having a spherically curved bottom surface and horizontal flat top surface, seated on the flange top surface and conforming thereto. The upper ring extends around the main body with a lateral clearance and has a lateral clearance with the side wall of the lower housing. It will be noted that the upper ring permits the upper housing to tilt and it can move laterally with the upper housing;

An annular cap which threads onto the upper end of the lower housing side wall. The cap has a transverse wall which retains the upper ring, upper housing flange and lower ring in place on the annular shoulder, within the upper bore portion of the lower housing. The cap forms a central opening through which the main body of the upper housing extends with a lateral clearance;

Annular means, seated in the upper end of the main body bore, for centralizing the polished rod within the main body;

Means for sealing the assembly of rings and flange with the lower housing, to prevent leakage of pressurized fluid through the lower housing bore;

Means for sealing the centralizing means with the upper housing to prevent leakage of fluid therebetween; and Closure means, such as a spring-actuated flapper valve, suspended from the lower ring, for automatically closing the lower ring opening when the polished rod is not present therein.

By means of this combination of components, the upper housing and its attached stuffing box may tilt with, move laterally with and remain coaxial with the polished rod.

Broadly, the invention involves:

the provision of a flange, on the upper housing, which has spherically curved top and bottom surfaces having a common center;

the provision of spherically curved bearing surfaces on the lower and upper rings, which conform to and bracket the flange, whereby the upper housing can tilt by sliding between them; and the provision of the lower ring extending partway over the lower portion of the lower housing bore, to provide a support from which to suspend a bore closure means.

In one embodiment, the invention comprises a support assembly, for connection between the upper end of a production pumping tree and the lower end of a stuffing box and through which a polished rod will extend, comprising: a tubular lower housing having a side wall and upper and lower ends, the side wall forming a central bore therethrough, the bore having a lower portion and an expanded diameter upper portion, the side wall forming an annular flat internal shoulder at the junction of the upper and lower bore portions; a lower ring, having a flat bottom surface and a spherically curved top surface, seated on the shoulder, the lower ring having a central opening of sufficient diameter to accommodate the polished rod with a lateral clearance, the lower ring having a lateral clearance with the side wall of the lower housing; an upper housing comprising a tubular main body having upper and lower ends, the body lower end having an outwardly protruding flange, the flange being positioned in the upper portion of the lower housing bore and being seated on the lower ring, the flange having spherically curved upper and lower surfaces having a common center, the flange lower surface conforming to the top surface of the lower ring, the main body having a central bore extending therethrough for accommodating the polished rod, the flange having a lateral clearance with the lower housing side wall; an upper ring having a spherically curved bottom surface for conforming with and contacting the flange upper surface to retain the flange against upward movement; an annular cap attached to the upper end of the lower housing, the cap having a transverse wall having a bottom surface retaining the rings and flange within the expanded diameter upper portion of the lower housing bore, the cap wall forming a central opening through which the main body of the upper housing extends with a lateral clearance; and means, seated in the upper end of the main body bore, for centralizing the polished rod within the main body; whereby the upper housing may tilt coaxially with the polished rod and move laterally to a limited extent.

DESCRIPTION OF THE PREFERRED EMBODIMENT

Figure 1:
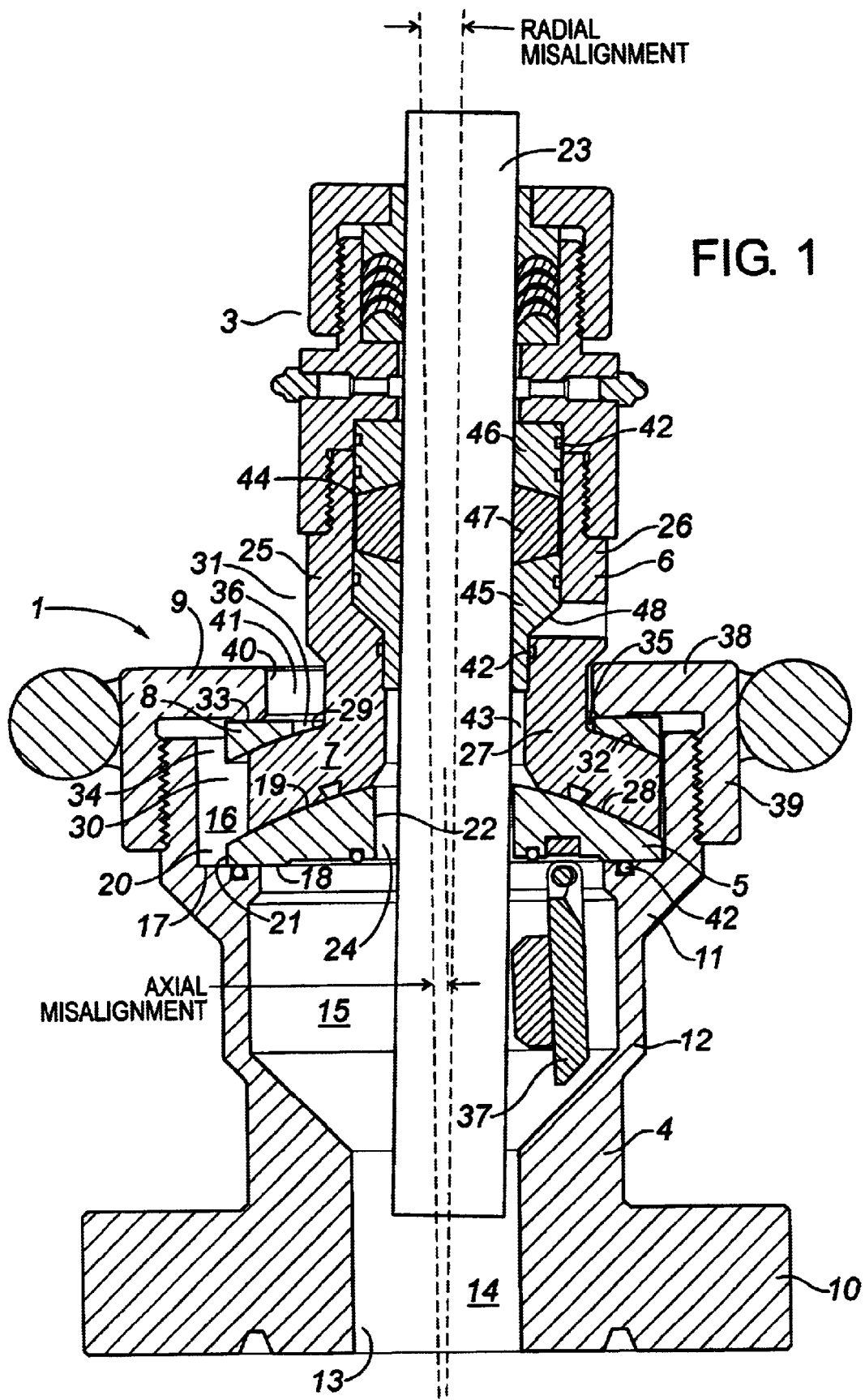
FIG. 1 is a cross-sectional side view showing a support assembly in accordance with the invention, connected with a stuffing box.
Figure 2:
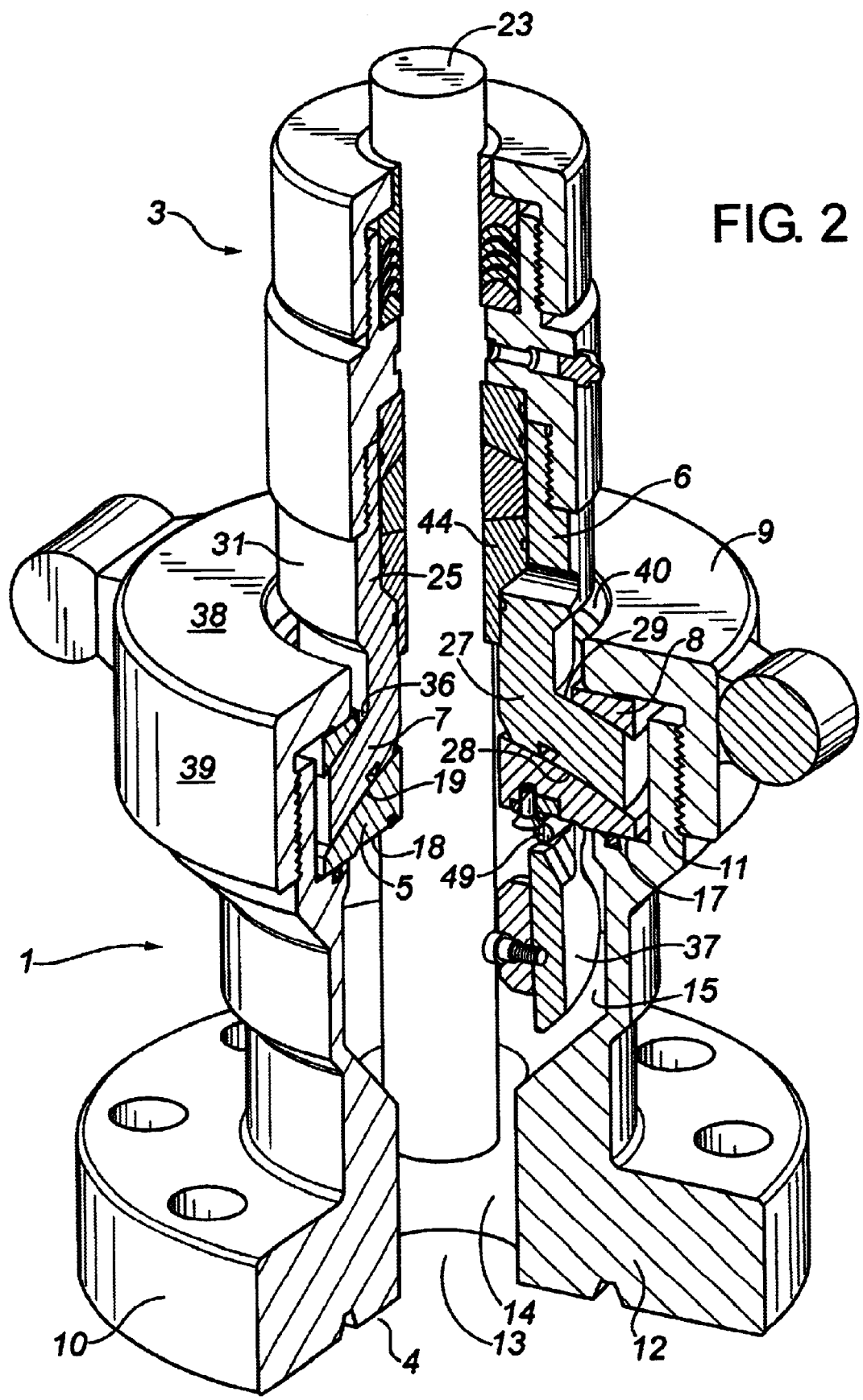
FIG. 2 is a perspective, partly cut away view of the support assembly and stuffing box of FIG. 1.

The present invention is concerned with a support assembly 1, to be connected between the production pumping tree and stuffing box 3 of the wellhead of a pumping well.

The support assembly 1 comprises a lower housing 4, a lower ring 5, an upper housing 6 having a flange 7, an upper ring 8, a cap 9 and a flapper valve 37.

More particularly, the lower housing 4 is generally tubular, having a bottom flange 10 for connection with the pumping tree and an externally threaded upper end 11 for connection with the cap 9. The lower housing side wall 12 forms a central vertical bore 13 having a reduced diameter lower bore portion 14, an expanded diameter intermediate bore portion 15 and a further expanded diameter upper bore portion 16. A horizontal, annular internal shoulder 17 is formed by the lower housing side wall 12 at the junction of the intermediate and upper bore portions 15, 16.

The lower ring 5 is seated on the lower housing internal shoulder 17. It has a flat or horizontal bottom surface 18 and a spherically curved top surface 19. It extends inwardly and overhangs the lower housing's intermediate bore portion 15. It has a lateral clearance 20 between its circumferential surface 21 and the lower housing side wall 12. It forms a central opening 22 through which the polished rod 23 extends. There is a lateral clearance 24 between the ring 5 and the rod 23.

The upper housing 6 is seated on the top surface 19 of the lower ring 5. The main body 31 of the upper housing 6 is tubular, having a side wall 25 which has upper and lower ends 26, 27. The side wall lower end 27 has an outwardly protruding flange 7 having spherically curved bottom and top surfaces 28, 29 which conform with or have a common center with the top surface 19 of the lower ring 5. The flange 7 has a lateral clearance 30 with the lower housing side wall 12.

The upper ring 8 is seated on the top surface 29 of the flange 7. As shown, the upper ring 8 has a spherically curved bottom surface 32 which conforms or shares a common center with the flange upper surface 29. It has a flat horizontal top surface 33. It also has a lateral clearance 34 with the lower housing side wall 12. It forms a central opening 35 through which the upper housing side wall 25 extends. There is a lateral clearance 36 between the upper ring 8 and the upper housing side wall 25.

The cap 9 has a transversely extending horizontal wall 38 and a downwardly extending side wall 39. The side wall 39 is internally threaded so that the cap 9 can be connected with the upper end 11 of the lower housing 4. The cap 9 has a central opening 40 through which the upper housing side wall 25 extends. There is a lateral clearance 41 between the cap 9 and the upper housing side wall 25. The cap 9 functions to retain the rings 5 and 8 and the lower end 27 of the upper housing 6 within the upper bore portion 16 of the lower housing 4.

There is a clearance 43 between the side wall 25 of the upper housing main body 31 and the polished rod 23. Centralizing means 44, comprising bottom and top rings 45, 46 and packing 47, are positioned in the clearance 43. The upper housing side wall 25 forms an internal tapered shoulder 48 on which the stack of rings 45, 46 and packing 47 seat. The centralizing means 44 function to ensure coaxial alignment between the polished rod 23 and the upper housing 6.

Suitable seals 42 are provided to prevent leakage of pressurized fluid from the lower housing bore 13.

A conventional stuffing box 3 is threaded onto the externally threaded upper end 26 of the upper housing side wall 25.

A spring-actuated flapper valve 37 is suspended from the bottom surface of the lower ring 5. The spring 49 acts to normally urge the flapper valve 37 to the closed position, to seal the lower ring opening 22 when the polished rod 23 is absent.

The upper housing 6 and connected stuffing box 3 are rigidly connected together and are maintained in coaxial relationship with the polished rod 23 by the centralizing means 44. However the upper housing 6 can tilt and move laterally relative to the rigidly stationary lower housing 4, to allow for its coaxial alignment with the polished rod 23, while effective sealing is maintained.

The support assembly is characterized by its compact height.

The embodiments of the invention in which an exclusive property of privilege is claimed are defined as follows:

1. A support assembly, for connection between the upper end of a production pumping tree and the lower end of a stuffing box and through which a polished rod will extend, comprising:

a tubular lower housing having a side wall and upper and lower ends, the side wall forming a central bore therethrough, the bore having a lower portion and an expanded diameter upper portion, the side wall forming an annular flat internal shoulder at the junction of the upper and lower bore portions;

a lower ring, having a flat bottom surface and a spherically curved top surface, seated on the shoulder, the lower ring having a central opening of sufficient diameter to accommodate the polished rod with a lateral clearance, the lower ring having a lateral clearance with the side wall of the lower housing;

an upper housing comprising a tubular main body having upper and lower ends, the body lower end having an outwardly protruding flange, the flange being positioned in the upper portion of the lower housing bore and being seated on the lower ring, the flange having spherically curved upper and lower surfaces having a common center, the flange lower surface conforming to the top surface of the lower ring, the main body having a central bore extending therethrough for accommodating the polished rod, the flange having a lateral clearance with the lower housing side wall;

an upper ring seated on the flange, the upper ring having a spherically curved bottom surface for conforming with and contacting the flange upper surface to retain the flange against upward movement, the upper ring having a lateral clearance with the side wall of the lower housing;

an annular cap attached to the upper end of the lower housing, the cap having a transverse wall having a bottom surface retaining the rings and flange within the expanded diameter upper portion of the lower housing bore, the cap wall forming a central opening through which the main body of the upper housing extends with a lateral clearance; and means for centralizing the polished rod within the main body;

whereby the upper housing may tilt coaxially with the polished rod and move laterally to a limited extent.

2. The support assembly as set forth in claim 1 wherein the diameter of the central opening of the lower ring is smaller that the diameter of the lower portion of the lower housing bore, so that the lower ring overhangs and extends part-way across the top end of the lower portion; and comprising closure means, suspended from the bottom surface of the lower ring, for automatically closing the lower ring central opening when the polished rod is not extending therethrough.

3. The support assembly as set forth in claim 2, wherein:

the lower hosing side wall internal shoulder, lower ring bottom surface, upper ring top surface and the cap transverse wall bottom surface are all horizontal;

said support assembly comprising:

means for sealing the support assembly to prevent the upward escape of fluid therethrough.

* * * * *

UNITED STATES PATENT AND TRADEMARK OFFICE
CERTIFICATE OF CORRECTION

PATENT NO. : 6,637,509 B2 Page 1 of 1
DATED : October 28, 2003
INVENTOR(S) : Farquharson et al.

It is certified that error appears in the above-identified patent and that said Letters Patent is hereby corrected as shown below:

Column 6,
Line 12, delete the word "that", and insert therefor -- than --;
Line 21, delete the word "hosing", and insert therefor -- housing --.

Signed and Sealed this

Ninth Day of December, 2003

JAMES E. ROGAN
*Director of the United States Patent and Trademark Office*